United States Patent
Koike

(10) Patent No.: US 11,878,893 B2
(45) Date of Patent: Jan. 23, 2024

(54) PAPER-LENGTH DETECTION DEVICE

(71) Applicant: TOSHIBA TEC KABUSHIKI KAISHA, Tokyo (JP)

(72) Inventor: Sho Koike, Sunto Shizuoka (JP)

(73) Assignee: Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 17/549,814

(22) Filed: Dec. 13, 2021

(65) Prior Publication Data

US 2022/0306415 A1  Sep. 29, 2022

(30) Foreign Application Priority Data

Mar. 23, 2021 (JP) ................ 2021-048703

(51) Int. Cl.
| | |
|---|---|
| B65H 1/04 | (2006.01) |
| B65H 1/26 | (2006.01) |
| B65H 7/02 | (2006.01) |
| B65H 3/06 | (2006.01) |

(52) U.S. Cl.
CPC ............. *B65H 7/02* (2013.01); *B65H 1/04* (2013.01); *B65H 1/266* (2013.01); *B65H 3/0669* (2013.01); *B65H 2511/11* (2013.01); *B65H 2511/20* (2013.01); *B65H 2553/22* (2013.01)

(58) Field of Classification Search
CPC ...... B65H 1/04; B65H 1/266; B65H 2511/11; B65H 2511/12; B65H 2511/22; B65H 2511/20; B65H 2511/21; B65H 2553/22; B65H 7/02; B65H 3/0669; G03G 15/607; B41J 11/003

See application file for complete search history.

(56) References Cited

U.S. PATENT DOCUMENTS

| | | | | |
|---|---|---|---|---|
| 6,070,048 | A | * | 5/2000 | Nonaka ............... B65H 1/00 399/376 |
| 6,254,085 | B1 | * | 7/2001 | Kang ................. B65H 1/266 271/171 |
| 9,434,560 | B2 | * | 9/2016 | Okada ................ B65H 3/06 |
| 2003/0151188 | A1 | * | 8/2003 | Imahara ............. B65H 1/00 271/171 |
| 2011/0127714 | A1 | * | 6/2011 | Kuo .................. B65H 1/00 271/171 |

FOREIGN PATENT DOCUMENTS

| | | |
|---|---|---|
| JP | 2005-330068 A | 12/2005 |
| JP | 2006273477 A * | 10/2006 |
| JP | 2009046262 A * | 3/2009 |

* cited by examiner

*Primary Examiner* — Luis A Gonzalez
(74) *Attorney, Agent, or Firm* — Kim & Stewart LLP

(57) ABSTRACT

According to an embodiment, a paper-length detection device includes: a moving mechanism and an angle sensor. The moving mechanism supports a magnet. The moving mechanism causes a first regulatory member to move closer to or further from a second regulatory member in accordance with movement of the first regulatory member. The moving mechanism further causes the magnet to rotate in accordance with the movement of the first regulatory member closer to or further from the second regulatory member. The angle sensor faces the magnet and outputs a signal corresponding to an absolute angle with the magnet.

12 Claims, 14 Drawing Sheets

PAPER-LENGTH DETECTION DEVICE

CROSS-REFERENCE TO RELATED APPLICATIONS

This application is based upon and claims the benefit of priority from the prior Japanese Patent Application No. 2021-048703, filed on Mar. 23, 2021, the entire contents of which are incorporated herein by reference.

FIELD

An embodiment to be described here generally relates to a paper-length detection device.

BACKGROUND

Various methods have been used to detect a paper length such as a paper width of an image forming apparatus. As a means for detecting a paper length of irregular sized paper, a means using an encoder has been known.

DETAILED DESCRIPTION

Figure 1:
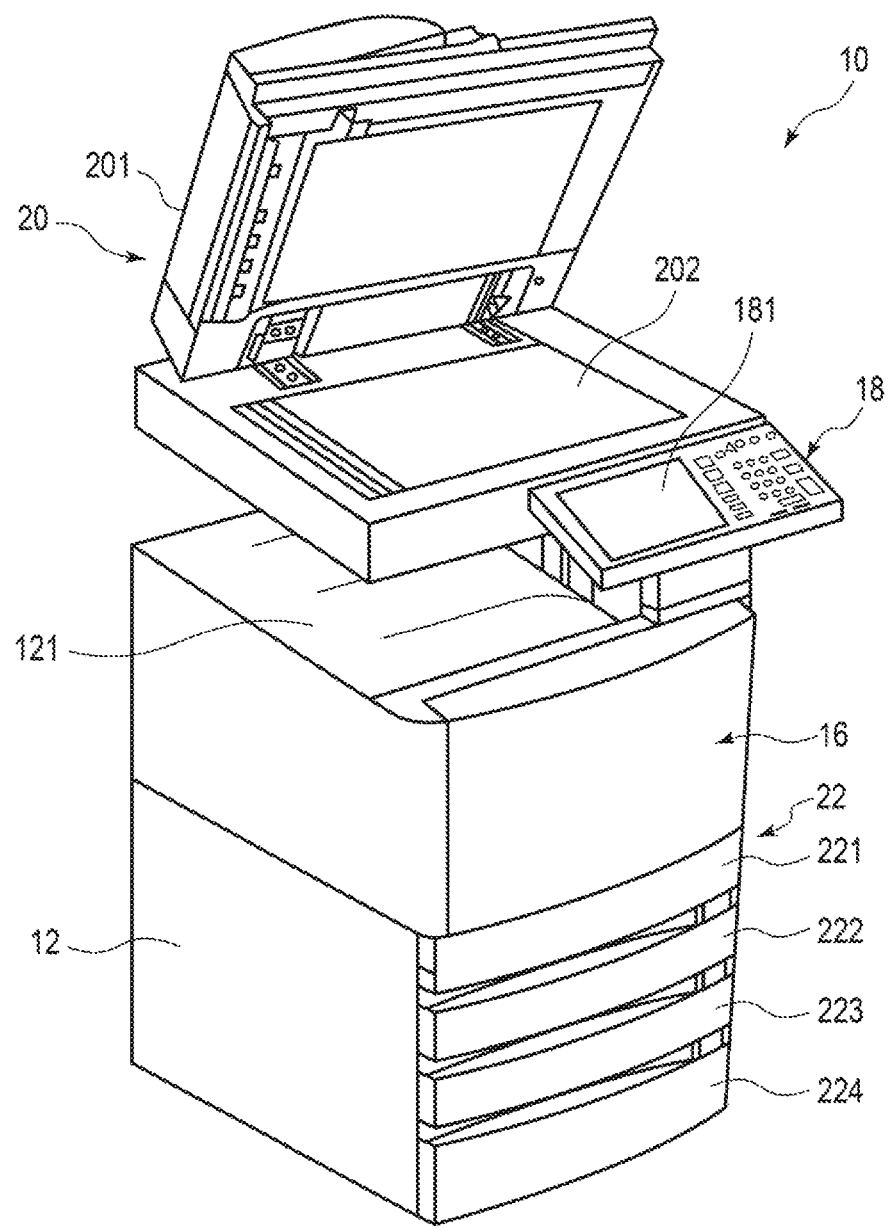
FIG. 1 is a perspective view showing an image forming apparatus according to an embodiment.

According to an embodiment, a paper-length detection device includes: a bottom plate; a first regulatory member; a second regulatory member; a magnet; a moving mechanism; and an angle sensor. A paper sheet is placed on the bottom plate, the paper sheet having a first edge and a second edge opposed to the first edge. The first regulatory member is provided to be capable of moving relative to the bottom plate in a direction in which the first edge and the second edge face each other, and is in contact with the first edge. The second regulatory member is in contact with the second edge. The magnet rotates while an S pole and an N pole are parallel to the bottom plate. The moving mechanism supports the magnet. The moving mechanism causes the first regulatory member to move closer to or further from the second regulatory member in accordance with the movement of the first regulatory member. The moving mechanism further causes the magnet to rotate in accordance with the movement of the first regulatory member closer to or further from the second regulatory member. The angle sensor faces the magnet and outputs a signal corresponding to an absolute angle with the magnet.

Hereinafter, an embodiment of a paper-length detection device 30 of an image forming apparatus 10 will be described with reference to the drawings will be described. In the drawings, the same reference symbols denote the same or similar portions.

First Embodiment

The image forming apparatus 10 according to the first embodiment will be described with reference to FIG. 1 to FIG. 9.

Figure 2:
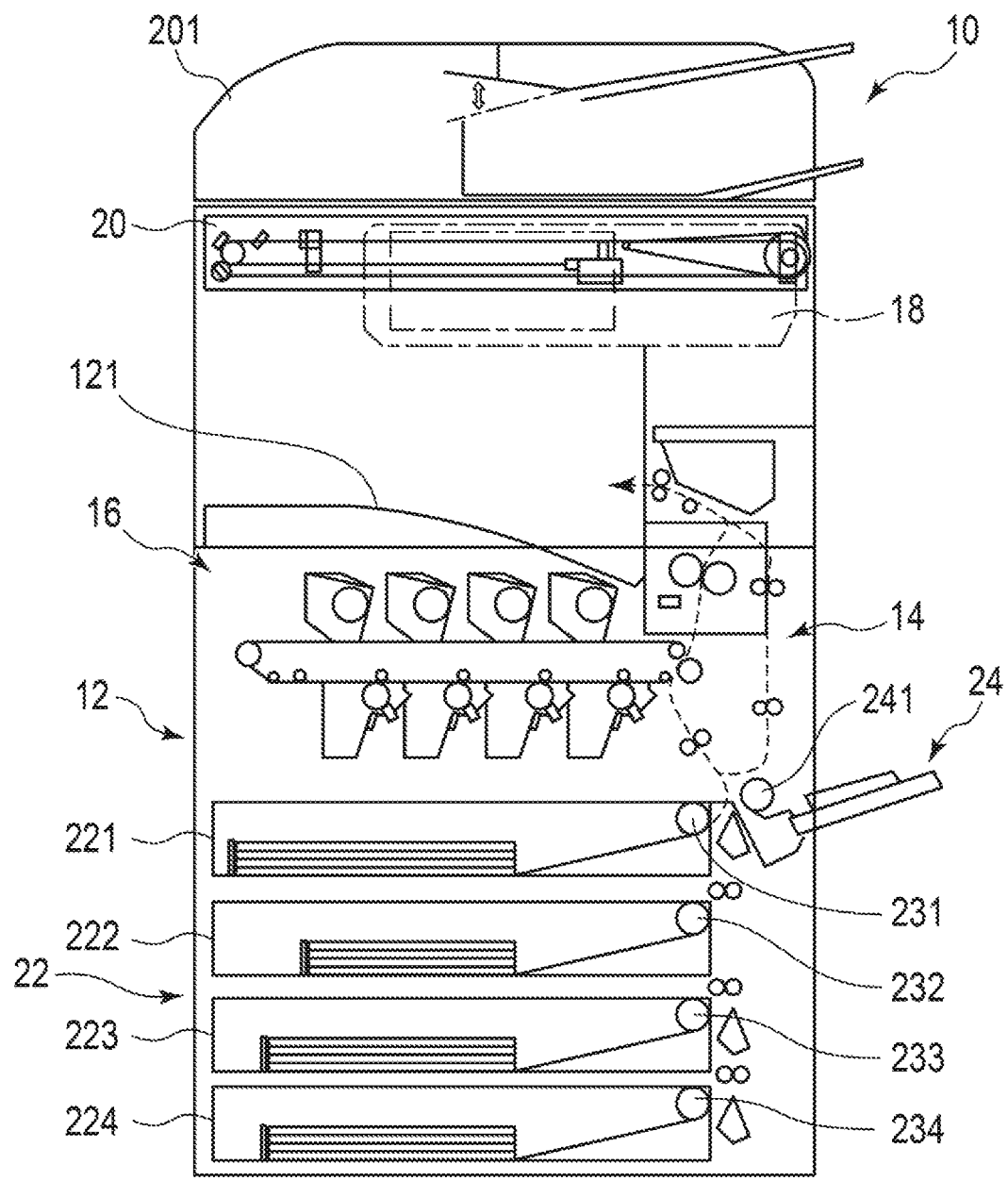
FIG. 2 is a cross-sectional view schematically showing the image forming apparatus according to the embodiment.

The image forming apparatus 10 shown in FIG. 1 and FIG. 2 is, for example, a multi function printer (MFP). The image forming apparatus 10 includes a body 12, a conveying device 14, a printer 16, an operation panel 18 including a display 181, a scanner 20, a paper cassette housing device 22, and a bypass tray 24.

Figure 3:
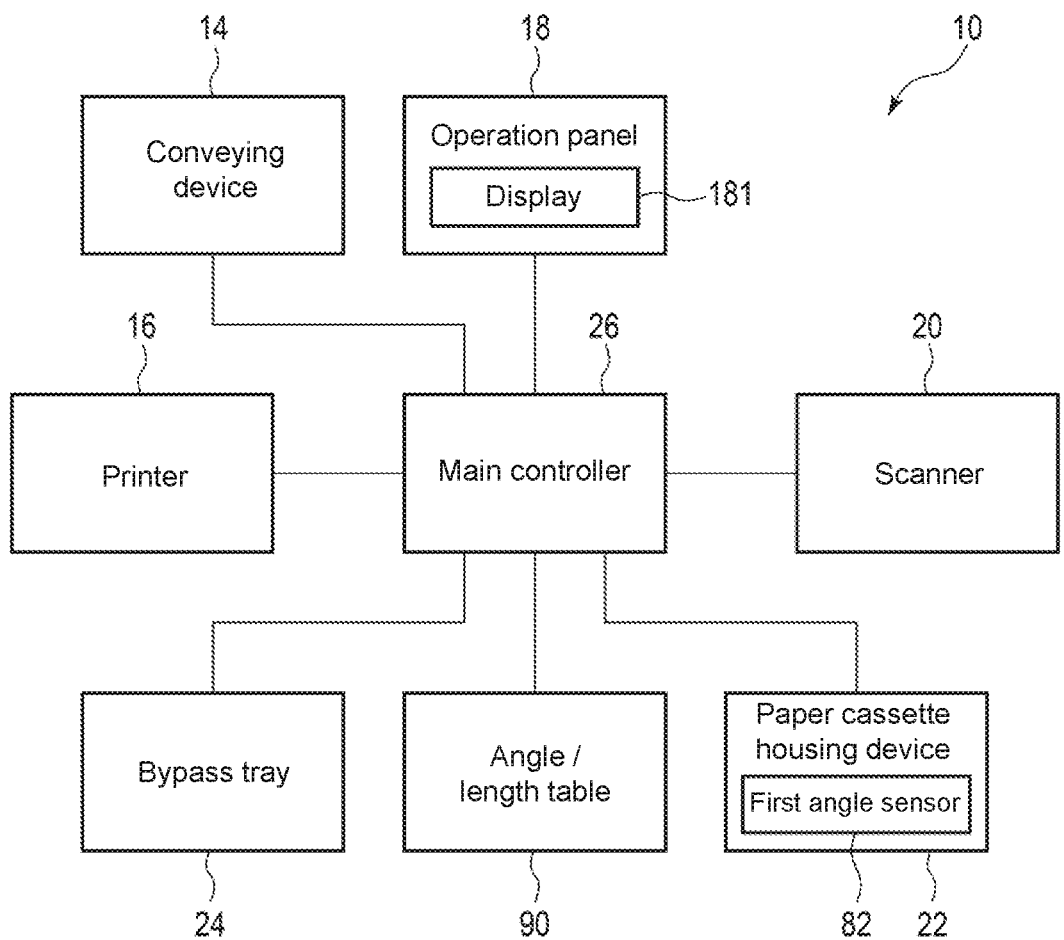
FIG. 3 is a block diagram showing an image forming apparatus according to a first embodiment.

As shown in FIG. 3, the image forming apparatus 10 further includes a main controller 26. The conveying device 14, the printer 16, the operation panel 18, the scanner 20, the paper cassette housing device 22, the bypass tray 24, and the main controller 26 are provided in the body 12. The main controller controls the conveying device 14, the printer 16, the operation panel 18, the scanner 20, the paper cassette housing device 22, and the bypass tray 24.

As shown in FIG. 1 and FIG. 2, for example, a plurality of paper cassettes 221, 222, 223, and 224 lined in the up-and-down direction is disposed in the paper cassette housing device 22. Each of the paper cassettes 221, 222, 223, and 224 houses, for example, a plurality of sheets of paper stacked as a paper sheet (medium on which an image is to be formed). The paper is, for example, paper or label paper. The paper sheet may be of any type as long as an image can be formed on the surface thereof. For simplification of description, assumption is made that a sheet of paper P (see a broken line in FIG. 4) as a paper sheet has a quadrangular shape such as a square shape and a rectangular shape, which has four edges Pa, Pb, Pc, and Pd.

Note that the side on which a user houses and draws out each of the paper cassettes 221, 222, 223, and 224 in/from the paper cassette housing device 22 is defined as the front side of the image forming apparatus 10. The image forming apparatus 10 is used while the respective paper cassettes 221, 222, 223, and 224 are housed in the paper cassette housing device 22.

The paper cassettes 221, 222, 223, and 224 respectively include paper feed rollers 231, 232, 233, and 234. The paper feed rollers 231, 232, 233, and 234 respectively take out the paper P one by one from the paper cassettes 221, 222, 223, and 224. The paper P taken out from each of the paper cassettes 221, 222, 223, and 224 is conveyed to the printer 16 by the conveying device 14.

The bypass tray 24 is provided on, for example, the right-hand surface of the body 12 as viewed from the front side of the image forming apparatus 10. The bypass tray 24 includes a paper feed roller 241. The paper feed roller 241 takes out the paper P one by one from the bypass tray 24. The paper P taken out from the bypass tray 24 is conveyed to the printer 16 by the conveying device 14.

The conveying device 14 conveys the paper P to the printer 16. The printer 16 forms an image on the paper P using a developer such as a toner. After forming an image on the paper P by the printer 16, the conveying device 14 conveys the paper P to a paper discharge unit 121 of the body 12.

The scanner 20 is provided, for example, above the paper discharge unit 121 of the body 12. The scanner 20 includes an automated document feeder (ADF) 201 and a document glass 202. The ADF 201 is rotatably supported relative to the body 12. While the ADF 201 is closed, the ADF 201 covers the whole document reading area in the document glass 202.

Figure 4:
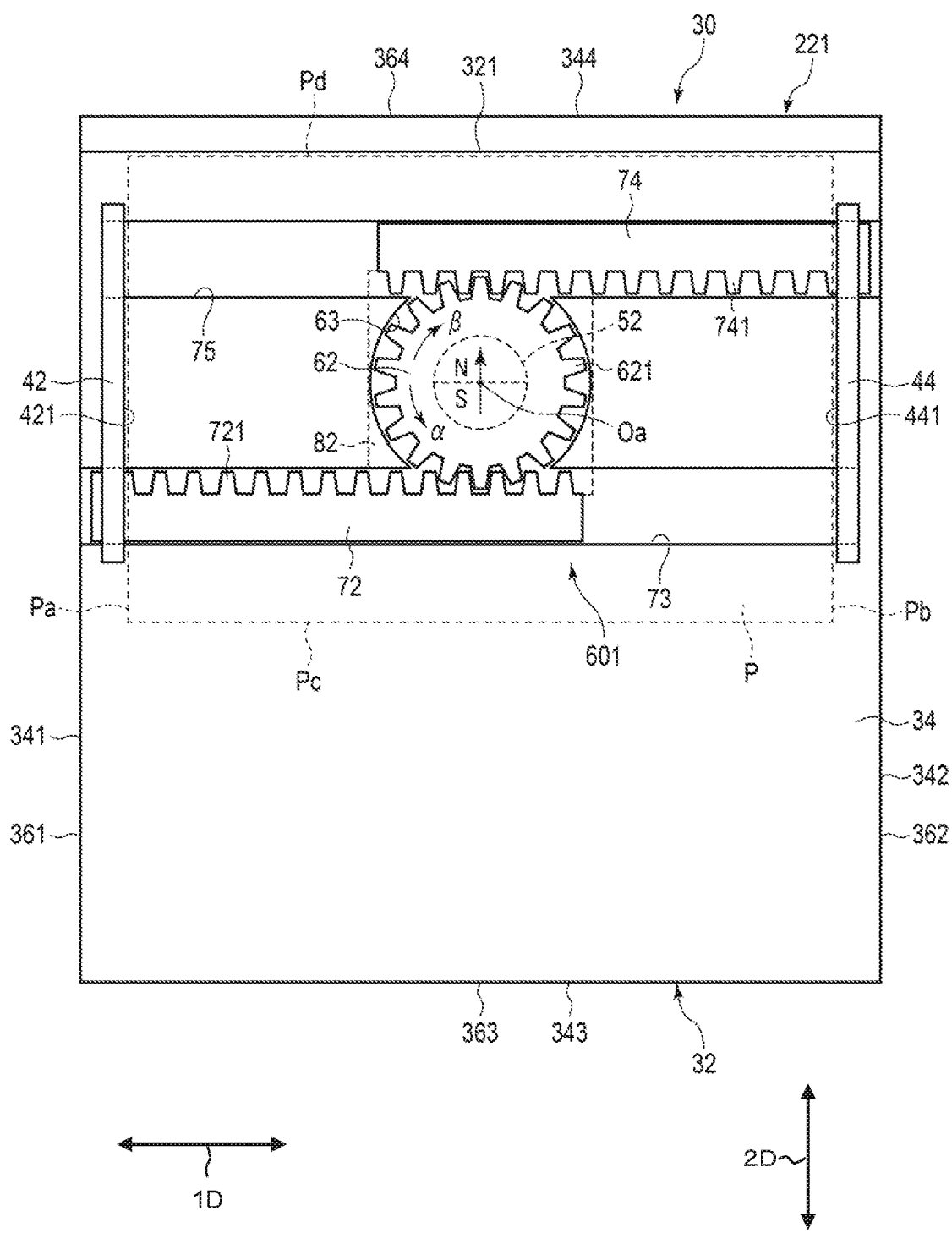
FIG. 4 is a top view showing a paper cassette of the image forming apparatus according to the first embodiment.

As shown in FIG. 4, the paper cassette housing device 22 and the paper cassette 221 include the paper-length detection device 30. The paper-length detection device 30 includes, for example, a box-shaped paper housing unit 32 opened at the top. The paper housing unit 32 includes a substantially rectangular bottom plate 34 and side plates 361, 362, 363, and 364. The side plates 361, 362, 363, and 364 are respectively provided on four edges 341, 342, 343, and 344 of the bottom plate 34. The side plates 361 and 362 are used as rails when the paper housing unit 32 of the paper cassette 221 is taken out and housed from/in a predetermined position of the body 12. The side plate 363 is used as a handle when a user takes out or houses the paper housing unit 32 of the paper cassette 221 from/in a predetermined position of the body 12. The side plate 364 is positioned on the back side when the paper housing unit 32 of the paper cassette 221 is housed in a predetermined position of the body 12.

In this embodiment, a case where the pair of edges 341 and 342 of the bottom plate 34 opposed to each other are longer than the other pair of edges 343 and 344 is described as an example. The opposing direction between the edges 341 and 342 is defined as a first length direction 1D of the paper cassette 221 and the paper P. The opposing direction between the edges 343 and 344 is defined as a second length direction 2D of the paper cassette 221 and the paper P. The magnitude relationship between the first length direction 1D and the second length direction 2D in the bottom plate 34 may be the same or differ and may be appropriately set. The paper length that can be detected by the paper-length detection device 30 according to this embodiment is a length in the direction along the first length direction 1D.

The paper P that can be used in the image forming apparatus 10 according to this embodiment has, for example, a rectangular shape, and includes edges Pa, Pb, Pc, and Pd. The size of the paper P that can be used in the image forming apparatus 10 according to this embodiment depends on, for example, the specifications of the body 12, the conveying device 14, the printer 16, and the paper cassette 221 of the image forming apparatus 10. The upper limit of the size of the paper P that can be used in the image forming apparatus 10 according to this embodiment is set to, for example, a size exceeding the A0 size in accordance with the specifications of the image forming apparatus 10, and the lower limit thereof may be set to, for example, a size lower than the postcard size. Note that the phrase "the paper P has a fixed size" represents that the paper P has a standardized size such as the A size and the B size defined by ISO 216 or JIS P 0138. The phrase "the paper P has an irregular size" represents that the paper P has a size outside a fixed size that is not defined by ISO 216 or JIS P 0138.

As shown in FIG. 4, the paper housing unit 32 includes a positioning unit 321 for the paper P on the side of the edge 344 of the four edges 341, 342, 343, and 344 of the bottom plate 34. The positioning unit 321 is disposed on, for example, the side opposite to the side plate 363, i.e., on the side of the side plate 364, in the bottom plate 34. The positioning unit 321 locates, when the one edge Pd of the paper P abuts against the positioning unit 321, the position of the paper P relative to the bottom plate 34 in the second length direction 2D of the bottom plate 34.

The size of the bottom plate 34 of the paper housing unit 32 is a size capable of conveying the paper P by the conveying device 14 of the image forming apparatus 10 and is determined by a paper size capable of printing an image by the printer 16. The bottom plate 34 of the paper housing unit 32 according to this embodiment is formed to have, for example, a size capable of housing the paper P of the A3 size.

Figure 5:
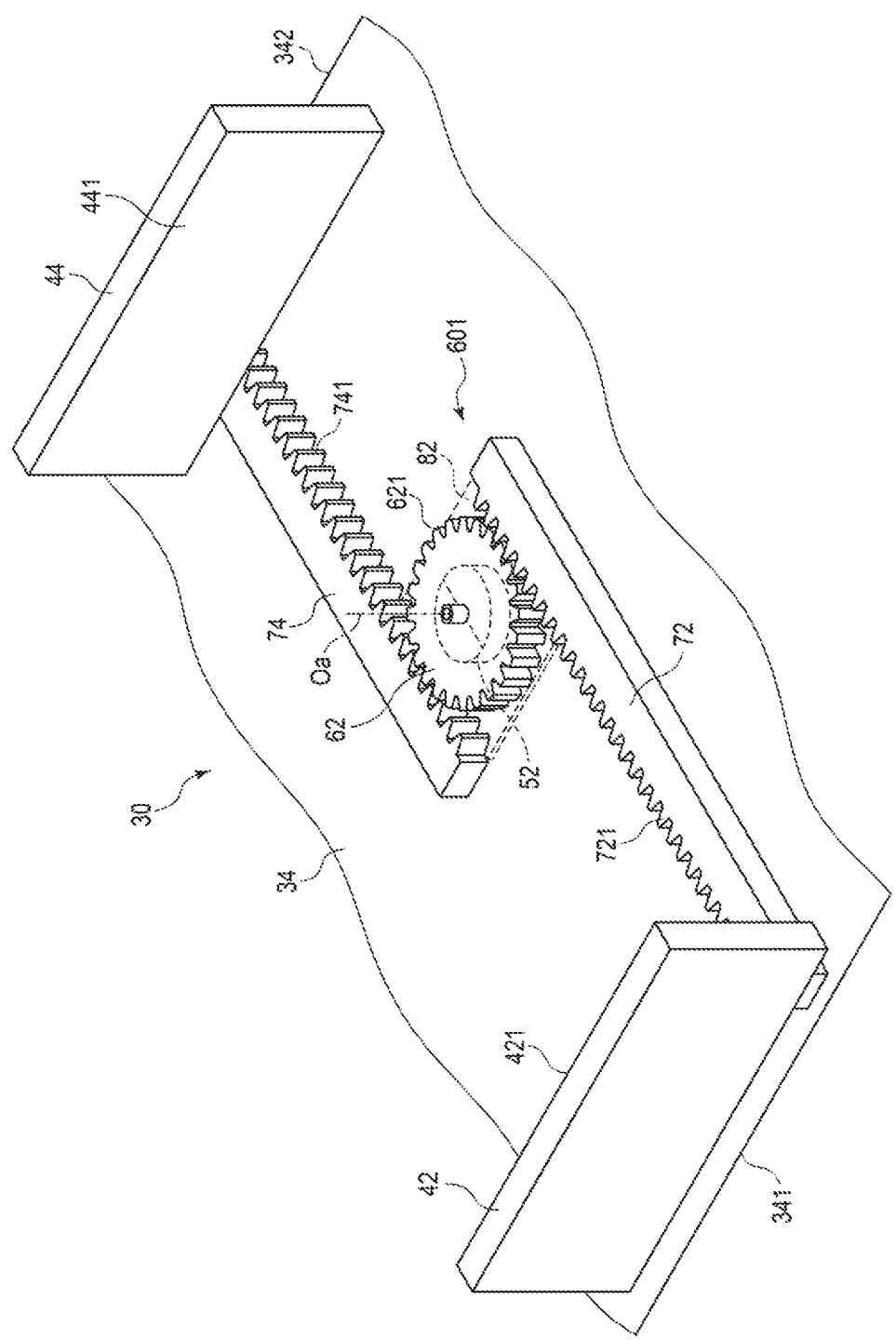
FIG. 5 is a perspective view showing part of a paper-length detection device of the paper cassette of the image forming apparatus according to the first embodiment.

As shown in FIG. 4 and FIG. 5, the paper-length detection device 30 includes a first regulatory member (paper regulating unit) 42) and a second regulatory member (paper regulating unit) 44. The first regulatory member 42 has a regulating surface 421 that regulates a first edge Pa of the paper P. The second regulatory member 44 has a regulating surface 441 that regulates a second edge Pb opposite to the first edge Pa of the paper P. The regulating surface 421 of the first regulatory member 42 and the regulating surface 441 of the second regulatory member 44 are opposed to each other and are capable of moving closer to or further from each other along the first length direction 1D. The distance between the regulating surfaces 421 and 441 opposed to each other of the first regulatory member 42 and the second regulatory member 44 is defined as the distance between the first regulatory member 42 and the second regulatory member 44.

The paper-length detection device 30 includes a first magnet 52 that is rotatable with the magnetization direction from the S pole to the N pole being parallel to the bottom plate 34. As the first magnet 52, a permanent magnet is favorably used. In this embodiment, the first magnet 52 is formed in, for example, a disk shape. The first magnet 52 may be formed into a rectangular parallelepiped shape or the like including a ring shape and a bar shape.

The paper-length detection device 30 includes a first moving mechanism 601 that supports the first magnet 52 and causes the first magnet 52 to rotate in accordance with causing the first regulatory member 42 and the second regulatory member 44 to move relative to the bottom plate 34. The first moving mechanism 601 is a rotation-converting mechanism that converts linear movement of the first regulatory member 42 and the second regulatory member 44 into rotation of the first magnet 52.

The first moving mechanism 601 includes a first rotating body 62 that supports the first magnet 52 and has a disk shape. The first rotating body 62 is housed in a substantially circular recessed portion 63 formed on the bottom plate 34. A virtual central axis (rotation shaft) Oa of the first rotating body 62 extends in a direction perpendicular to the surface of the paper P housed in the paper housing unit 32. In this embodiment, the first rotating body 62 includes, on the outer peripheral surface, a plurality of first engagement teeth (first gear) 621. The first rotating body 62 is formed as, for example, a pinion having the first engagement teeth 621 as a pinion gear.

The central axis Oa of the first rotating body 62 is suitably consistent with the central axis of the first magnet 52. It is suitable that the central axis Oa of the first magnet 52 and the first rotating body 62 is located at the central position of the paper cassette 221 in the first length direction 1D.

The first moving mechanism 601 includes a first extending member 72 that is fixed to the first regulatory member 42 and extends from the first regulatory member 42 toward the second regulatory member 44 along the first length direction 1D. The first extending member 72 has, for example, an elongated rectangular plate shape. The first extending member 72 is housed in a recessed portion 73 formed on the bottom plate 34. The recessed portion 73 is formed parallel to the positioning unit 321 between the side plates 361 and 362. The recessed portion 73 continues to the recessed portion 63. The first extending member 72 moves within a predetermined range of the recessed portion 73 while being parallel to the positioning unit 321. In this embodiment, the first extending member 72 includes a plurality of first teeth portions (second gear) 721 that engages with the first engagement teeth 621 of the first rotating body 62 at the end on the side of the positioning unit 321. The first extending member 72 is formed as, for example, a rack having the first teeth portions 721 as a rack gear. Therefore, the first extending member 72 and the first rotating body 62 are in a rack-and-pinion relationship.

In this embodiment, the first moving mechanism 601 includes a second extending member 74 that is fixed to the second regulatory member 44 and extends from the second regulatory member 44 toward the first regulatory member 42 along the first length direction 1D. The second extending member 74 has, for example, an elongated rectangular plate shape. The second extending member 74 is housed in a recessed portion 75 formed in the bottom plate 34. The recessed portion 75 is formed parallel to the positioning unit 321 between the side plates 361 and 362. The second extending member 74 and the recessed portion 75 are located closer to the positioning unit 321 than the first extending member 72 and the recessed portion 73. The recessed portion 75 continues to the recessed portion 63. The second extending member 74 moves within a predetermined range while being parallel to the positioning unit 321. In this embodiment, the second extending member 74 includes second teeth portions (second gear) 741 that engage with the first engagement teeth 621 of the first rotating body 62 at the end on the side opposite to the positioning unit 321. The second extending member 74 is formed as, for example, a rack having the second teeth portions 741 as a rack gear. Therefore, the second extending member 74 and the first rotating body 62 are in a rack-and-pinion relationship.

Figure 6:
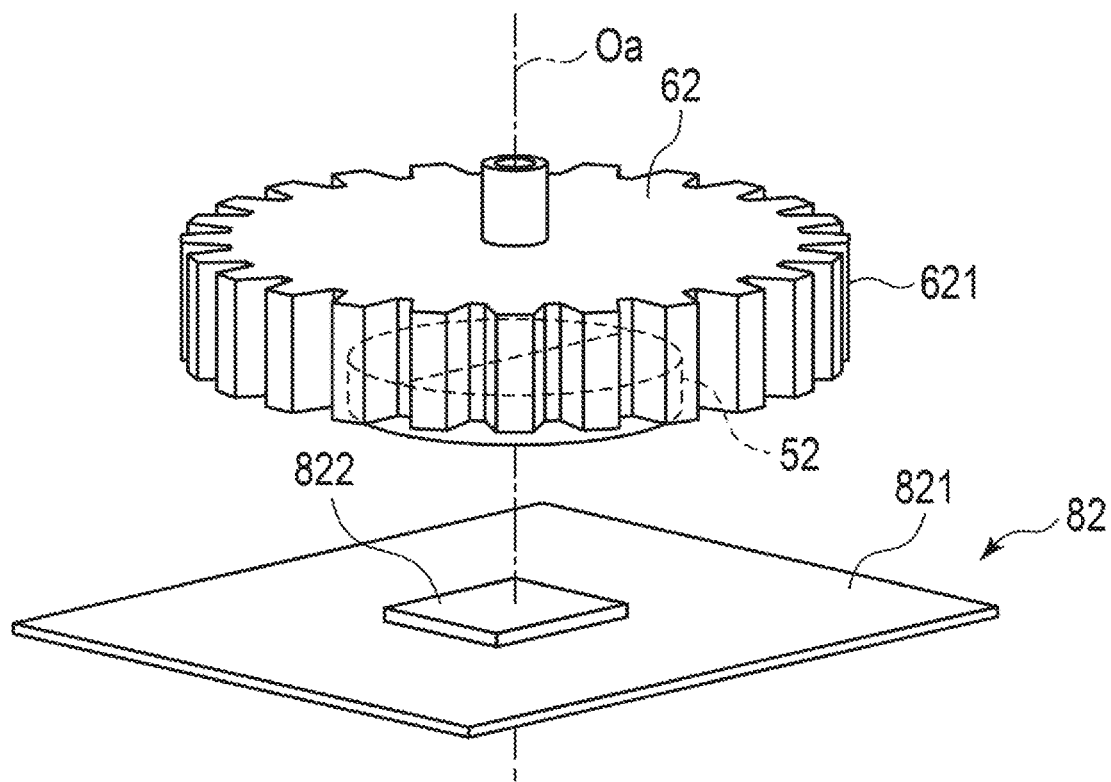
FIG. 6 is a perspective view showing a positional relationship between a first rotating body, a first magnet, and a first angle sensor of the paper-length detection device shown in FIG. 4 and FIG. 5.

As shown in FIG. 4 to FIG. 6, the paper-length detection device 30 includes a first angle sensor 82 at a position facing the first magnet 52. The first angle sensor 82 is suitably provided in the paper cassette housing device 22 below the bottom plate 34. As shown in FIG. 6, the first angle sensor 82 includes a substrate 821, and an angle sensor element 822 that is fixed to the substrate 821 and outputs a signal corresponding to an absolute angle with the first magnet 52. The substrate 821 and the angle sensor element 822 are located immediately below the first magnet 52 and spaced apart from the first magnet 52. The substrate 821 is fixed to the paper cassette housing device 22.

As shown in FIG. 3, the first angle sensor 82 is connected to the main controller 26 and controlled by the main controller 26 in this embodiment.

Figure 7:
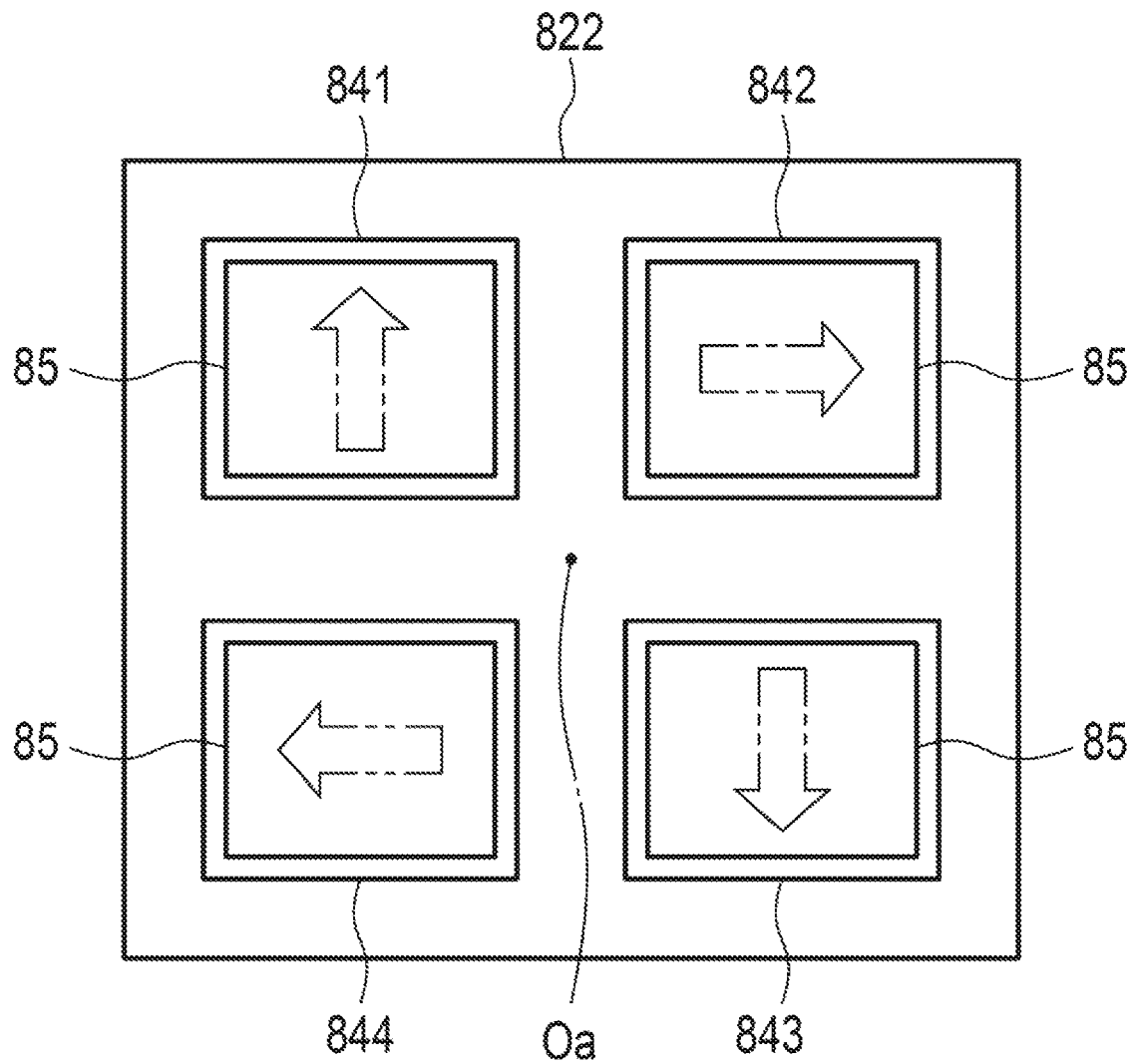
FIG. 7 is a schematic diagram showing the first angle sensor shown in FIG. 6.

As shown in FIG. 7, the angle sensor element 822 includes four magnetic detection elements 841, 842, 843, and 844. These magnetic detection elements 841, 842, 843, and 844 each include a magnetic resistance element 85 magnetized in a direction indicated by an arrow in FIG. 7. The magnetization directions of the magnetic resistance elements 85 are perpendicular to each other between the magnetic resistance elements 85. As each of the magnetic detection elements 841, 842, 843, and 844, for example, those capable of outputting, as, for example, an output voltage change, the magnetic field that varies periodically with the rotation of the first magnet 52, such as a giant magnetoresistive (GMR type) one and a tunneling magnetoresistive (TMR type) one, are used.

If the angle sensor element 822 of the first angle sensor 82 has a rectangular shape, it is favorable that the central axis Oa of the first magnet 52 and the first rotating body 62 passes through the center of gravity of the angle sensor element 822. Regardless of whether or not the first magnet 52 rotates, the four magnetic detection elements 841, 842, 843, and 844 output respective signals (two-phase signals) of $\sin \theta$, $\cos \theta$, $-\sin \theta$, and $-\cos \theta$ that are shifted by ¼ cycle. These two-phase signals are input to the main controller 26 via the substrate 821.

The main controller 26 shown in FIG. 3 amplifies, as necessary, the respective signals of $\sin \theta$, $\cos \theta$, $-\sin \theta$, and $-\cos \theta$ output from the first angle sensor 82, performs A/D conversion thereon, performs calculation to obtain arctan (sin/cos), and output the absolute angle of the first magnet 52. In this embodiment, the first angle sensor 82 outputs the two-phase signals to the main controller 26. For this reason, the main controller 26 outputs the absolute angle less than one rotation of the first magnet 52 (0° or more to less than) 360° on the basis of the output signal of the first angle sensor 82.

In the first moving mechanism 601 of the paper-length detection device 30 according to this embodiment shown in FIG. 4 to FIG. 6, it is favorable that the first magnet 52 is not rotated by one rotation from the position where the distance between the first and second regulatory members 42 and 44 is the smallest to the position where the distance is the largest. For, example, assumption is made that the magnetization direction of the first magnet 52, i.e., the direction in which the N pole faces at the position where the distance between the first and second regulatory members 42 and 44 is the smallest is a direction of 0° with respect to the central axis Oa of the first magnet 52 and the first rotating body 62. For example, assumption is made that the magnetization direction of the first magnet 52 at the position where the distance between the first and second regulatory members 42 and 44 is the largest has an angle smaller than 360° with respect to the central axis Oa of the first magnet 52 and the first rotating body 62, e.g., 350° (<360°). Hereinafter, description will be made assuming that the absolute angle of the first magnet 52 at the position where the distance between the first and second regulatory members 42 and 44 is the largest is 350°.

In the paper-length detection device 30, the first magnet is installed on the bottom plate 34 such that when the distance between the first regulatory member 42 and the second regulatory member 44 is the smallest, the output absolute angle of the first magnet 52 is 0° in the main controller 26 by the output from the first angle sensor 82. Similarly, in the paper-length detection device 30, the first magnet 52 is installed on the bottom plate 34 such that when the distance between the first regulatory member 42 and the second regulatory member 44 is the largest, the output absolute angle of the first magnet 52 is 350° in the main controller 26 by the output from the first angle sensor 82.

As shown in FIG. 3, the image forming apparatus 10 includes an angle/length table 90. The angle/length table 90 is controlled by the main controller 26. The angle/length table 90 is used as a storage unit that stores information of the distance between the first regulatory member 42 and the second regulatory member 44 corresponding to the absolute angle of the first magnet 52. Note that the angle/length table 90 stores, for every 0.5° or 1°, information of the distance between the first regulatory member 42 and the second regulatory member 44 in the range in which the absolute angle of the first magnet 52 is 0° to 350° (<360°).

Figure 8:
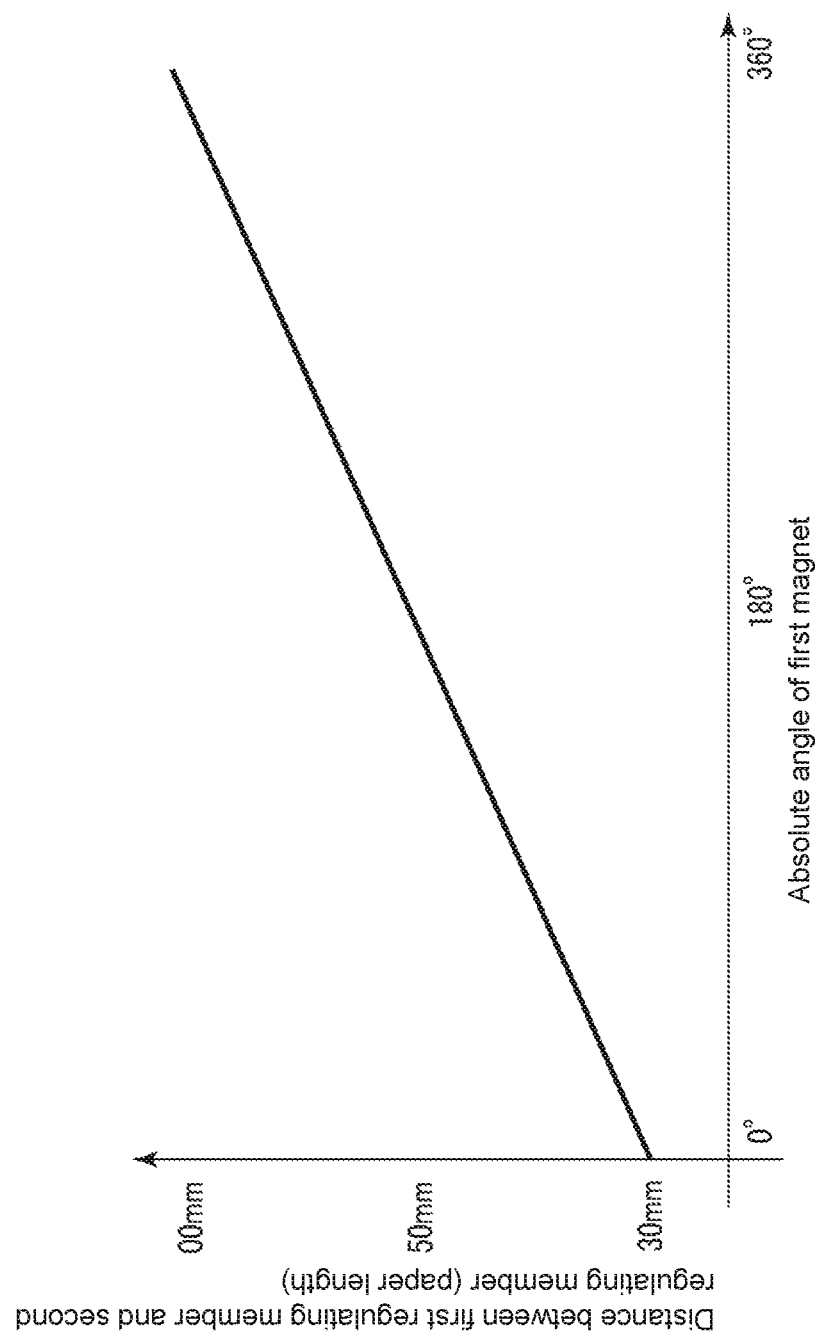
FIG. 8 is a graph showing a relationship between a first angle based on an output signal of the first angle sensor shown in FIG. 6 and a distance between a first regulatory member and a second regulatory member.

FIG. 8 shows an example of the relationship between the absolute angle of the first magnet 52 output by the main controller 26 on the basis of the signal output by the first angle sensor 82 and the distance between the first regulatory member 42 and the second regulatory member 44, in this embodiment. In the example shown in FIG. 8, in the case where the absolute angle of the first magnet 52 is 0°, the distance between the first regulatory member 42 and the second regulatory member 44 is approximately 30 mm. In the case where the absolute angle of the first magnet 52 is 350°, the distance between the first regulatory member 42 and the second regulatory member 44 is approximately 300 mm.

The relationship between the absolute angle of the first magnet 52 and the distance between the first regulatory member 42 and the second regulatory member 44 is changed depending on the size of the paper P to be detected, which needs to be measured. For example, when the distance between the first regulatory member 42 and the second regulatory member 44 is 841 mm (A0 size), when the absolute angle of the first magnet is, for example, 350°, the distance between the first regulatory member 42 and the second regulatory member 44 is approximately 841 mm. For this reason, the diameter of the first rotating body 62 and the number of teeth of the first engagement teeth 621 can be changed depending on the size of the paper P to be detected. Further, the distance between the first extending member 72 and the second extending member 74 can be changed in accordance with the size of the paper P to be detected. The number of the first teeth portions 721 of the first extending member 72 and the number of the second teeth portions 741 of the second extending member 74 can be changed depending on the size of the paper P to be detected.

Next, the operation of the paper-length detection device 30 the image forming apparatus 10 will be described.

A user of the image forming apparatus 10 causes the first regulatory member 42 and the second regulatory member 44 to move while the paper cassette 221 is pulled out from the paper cassette housing device 22. The first teeth portions 721 that is a rack gear moves in the first length direction 1D of the paper cassette 221 along the recessed portion 73, and the second teeth portions 741 that is a rack gear moves in the first length direction 1D of the paper cassette 221 along the recessed portion 75. At this time, the first engagement teeth 621 that is a pinion gear of the first rotating body 62 rotates in conjunction with the first teeth portions 721 and the second teeth portions 741.

The first extending member 72 and the second extending member 74 move along the recessed portions 73 and 75 in accordance with the movement of the first regulatory member 42 and the second regulatory member 44 in the proximate direction in which they come closer to each other along the first length direction 1D by the user. The movement of the first extending member 72 and the second extending member 74 along the recessed portions 73 and 75 causes the first rotating body 62 to rotate in a first direction α with respect to the central axis Oa. For this reason, the first magnet 52 supported by the first rotating body 62 rotates in the first direction α as the first rotating body 62 rotates in the first direction α.

The first rotating body 62 rotates in a second direction β with respect to the central axis Oa in accordance with the movement of the first regulatory member 42 and the second regulatory member 44 in a separation direction in which they are separated from each other along the first length direction 1D by the user. For this reason, the first magnet 52 supported by the first rotating body 62 rotates in the second direction β as the first rotating body 62 rotates in the second direction β. Therefore, the first rotating body 62 and the first magnet rotate in accordance with the movement of the first extending member 72 and the second extending member 74 along the recessed portions 73 and 75.

Note that when the user causes the first regulatory member 42 or the second regulatory member 44 to move in the first length direction 1D, the first extending member 72 and the second extending member 74 move in conjunction with each other by the first moving mechanism 601. The first extending member 72 causes the first rotating body 62 and the first magnet 52 to rotate at a rotation angle corresponding to the moving distance of the first regulatory member 42 when the first regulatory member 42 is caused to move relative to the bottom plate 34. The second extending member 74 causes the first rotating body 62 and the first magnet 52 to rotate at a rotation angle corresponding to the moving distance of the second regulatory member 44 when the second regulatory member 44 is caused to move relative to the bottom plate 34.

A method of detecting a paper length in which a length of the paper P in the first length direction 1D (a paper width or a paper length) is output using the paper-length detection device 30 of the image forming apparatus 10 will be described with reference to FIG. 9. Assumption is made that the paper cassette 221 is housed in the paper cassette housing device 22.

Figure 9:
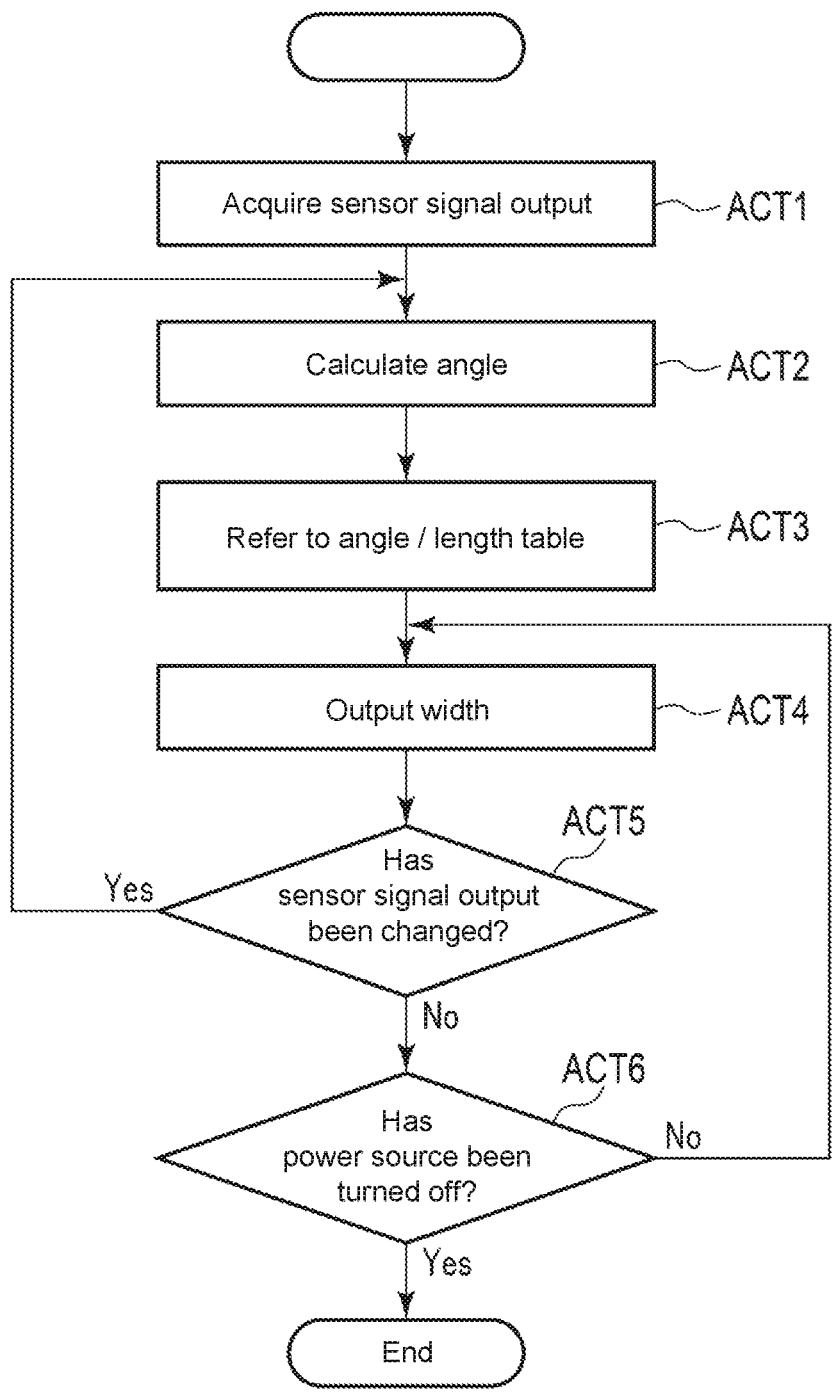
FIG. 9 is a flowchart of processing of detecting a paper size by the image forming apparatus according to the first embodiment.

For example, when the user turns on the power source of the image forming apparatus 10, the main controller 26 acquires the signal output from the first angle sensor 82 in ACT1 in FIG. 9.

In ACT2, the main controller 26 calculates the absolute angle of the first magnet 52 with respect to the first angle sensor 82 on the basis of the signal acquired from the first angle sensor 82.

In ACT3, the main controller 26 refers to the angle/length table 90 to acquire information of the distance corresponding to the absolute angle of the first magnet 52.

Then, in ACT4, the main controller 26 outputs, on the basis of the information stored in the angle/length table 90, information of the distance between the first regulatory member 42 and the second regulatory member 44 with respect to the absolute angle of the first magnet 52. The main controller 26 displays, for example, the information of the distance between the regulating surface 421 of the first regulatory member 42 and the regulating surface 441 of the second regulatory member 44 on the display 181.

Note that when one edge Pa of the paper P is in contact with the regulating surface 421 of the first regulatory member 42 and a different one edge Pb is in contact with the regulating surface 441 of the second regulatory member 44, the distance between the first regulatory member 42 and the second regulatory member 44 coincides with the length of the paper P in the first length direction 1D. For this reason, the information of the distance between the first regulatory member 42 and the second regulatory member 44 can be regarded as the paper width or the paper length when the one edge Pa of the paper P is in contact with the regulating surface 421 of the first regulatory member 42 and the different one edge Pb is in contact with the regulating surface 441 of the second regulatory member 44.

The main controller 26 may display information on the display 181 as the distance between the first regulatory member 42 and the second regulatory member 44, and display information on the display 181 as a paper width. When image data is printed on the paper P, the main controller 26 adjusts the magnification of image data in accordance with the information of the paper width or the paper length. The main controller 26 is capable of using the information of the paper width or the paper length of the paper P when performing control of printing image data within the range of the paper P, for example.

For example, the user pulls out the paper cassette 221 from the body 12 and manually changes the distance between the first regulatory member 42 and the second regulatory member 44. The user then houses the paper cassette 221 in the paper cassette housing device 22 of the body 12. After the user houses the paper cassette 221 in the paper cassette housing device 22, the main controller 26 determines, in ACT5 in FIG. 9, whether or not the output signal of the absolute angle of the first magnet 52 with respect to the first angle sensor 82 has been changed. In the case where the output signal of the absolute angle of the first magnet 52 with respect to the first angle sensor 82 has been changed (Yes in ACT5), the processing of the main controller 26 returns to ACT2 again. The main controller 26 outputs a new distance in ACT4 after the processing of ACT2 and ACT3.

In the case where the output signal of the absolute angle of the first magnet 52 with respect to the first angle sensor 82 has not been changed (No in ACT5), the processing of the main controller 26 proceeds to ACT6. In ACT6, the main controller 26 determines whether or not the power source of the image forming apparatus 10 has been turned off. In the case where the power source is turned off (Yes in ACT6), the main controller 26 ends the processing shown in FIG. 9. In the case where the power source has not been turned off and is in the ON-state (No in ACT6), the processing of the main controller 26 returns to ACT4 again.

As described above, the paper-length detection device 30 outputs the distance between the first regulatory member 42 and the second regulatory member 44 as a signal relating to an angle. The image forming apparatus 10 including the paper-length detection device 30 outputs the distance between the first regulatory member 42 and the second regulatory member 44. Therefore, the image forming apparatus 10 outputs the distance between the first regulatory member 42 and the second regulatory member 44 as the length in the first length direction 1D.

In accordance with this embodiment, the paper-length detection device 30 is capable of outputting a signal relating to the absolute angle of the first magnet 52 from the first angle sensor 82. For example, assumption is made that after the user manually operates the first regulatory member 42 and the second regulatory member 44 while the power source of the image forming apparatus 10 is in the OFF-state, the power source of the image forming apparatus 10 is turned on. The first angle sensor 82 of the paper-length detection device 30 outputs the signal relating to the absolute angle of the first magnet 52 to the main controller 26. Therefore, the image forming apparatus 10 is capable of outputting, even in the case where the power source has been turned off once, the distance between the first regulatory member 42 and the second regulatory member 44 when the power source is in the ON-state.

The output of a signal relating to an angle by the paper-length detection device 30 depends on the absolute angle of the first magnet 52 with respect to the first angle sensor 82. For this reason, the distance between the first regulatory member 42 and the second regulatory member 44 along the first length direction 1D does not depend on whether the paper P has a fixed size or an irregular size.

The first magnet 52 and the first angle sensor 82 are spaced apart from each other and are not in contact with each other. For this reason, the lifetime of the first angle sensor 82 is not affected by the sliding between the first extending member 72 and the recessed portion 73 and the sliding between the second extending member 74 and the recessed portion 75 according to the movement of the first regulatory member 42 and the second regulatory member 44.

The paper-length detection device according to this embodiment is capable of converting the linear movement of the first regulatory member 42 or the second regulatory member 44 into the rotational movement of the first rotating body 62. The first rotating body 62 includes, for example, the first engagement teeth 621. The first extending member 72 includes, for example, the first teeth portions 721 at the end thereof. The second extending member 74 includes, for example, the second teeth portions 741 at the end thereof. The movement is performed without sliding between the end surface of the first extending member 72 and the outer peripheral surface of the first rotating body 62 and between the end surface of the second extending member 74 and the outer peripheral surface of the first rotating body 62. For this reason, the absolute angle of the first magnet 52 maintains the state shown in FIG. 8 with respect to the distance according to the movement between the first regulatory member 42 and the second regulatory member 44. Therefore, when the first angle sensor 82 outputs a signal relating to the absolute angle of the first magnet 52, the main controller 26 is capable of outputting the distance between the first regulatory member 42 and the second regulatory member 44. If the movement is performed without sliding between the end surface of the first extending member 72 and the outer peripheral surface of the first rotating body 62, it does not necessarily need to provide the first engagement teeth 621 and the first teeth portions 721. If the movement is performed without sliding between the end surface of the second extending member 74 and the outer peripheral surface of the first rotating body 62, it does not necessarily need to provide the first engagement teeth 621 and the second teeth portions 741. Therefore, the first moving mechanism 601 only needs to cause the first rotating body 62 and the first magnet 52 to rotate in accordance with the distance between the first regulatory member 42 and the second regulatory member 44.

In this embodiment, an example in which the main controller 26 outputs the distance between the first regulatory member 42 and the second regulatory member 44 from the angle/length table 90 on the basis of the output of the absolute angle of the first magnet 52 of the first angle sensor 82 has been described. The graph shown in FIG. 8 may be converted into a formula, and the formula may be stored in the storage unit instead of the angle/length table 90. In this case, the main controller 26 is capable of substituting the output of the absolute angle of the first magnet 52 from the first angle sensor 82 into the formula described above and outputting the distance between the first regulatory member 42 and the second regulatory member 44.

In this embodiment, an example in which the first angle sensor 82 outputs two-phase signals relating to an absolute angle of 0° or more and less than 360° has been described. For example, the first angle sensor 82 may include two magnetic detection elements 841 and 842 and output one-phase signals relating to an absolute angle of 0° or more and less than 180°, i.e., less than a half rotation. In this case, the angle/length table 90 stores distances corresponding to angles of 0° or more and less than 180°. The main controller 26 is capable of outputting the distance corresponding to the output signal of an absolute angle of 0° or more and less than 180° by the first angle sensor 82.

In this embodiment, an example in which the paper cassette housing device 22 and the paper cassette 221 include the paper-length detection device 30 has been described. It is also suitable that the paper cassette housing device 22 and the different paper cassette 222, 223, or 224 include the paper-length detection device 30. It is also suitable that the bypass tray 24 incudes the paper-length detection device 30. Further, in this embodiment, an example in which the first angle sensor 82 is provided in the paper cassette housing device 22 has been described. Meanwhile, the first angle sensor 82 may be fixed to the bottom plate 34 of the paper cassette 221. In this case, the first angle sensor 82 is connected to the main controller 26 while the paper cassette 221 is housed in the paper cassette housing device 22, and the connection with the main controller 26 is released when the paper cassette 221 is pulled out from the paper cassette housing device 22.

The first moving mechanism 601 of the paper-length detection device 30 can be variously modified as long as the first magnet 52 can be caused to rotate in accordance with the movement of the first regulatory member 42 and the second regulatory member 44 closer to or further from each other.

An example in which both the first regulatory member 42 and the second regulatory member 44 move in conjunction with each other in the paper-length detection device 30 according to this embodiment has been described. In the paper-length detection device 30, one of the first regulatory member 42 and the second regulatory member 44 may move. For example, the regulating surface 441 of the second regulatory member 44 may be provided as a positioning unit similarly to the positioning unit 321. In this case, the first rotating body 62 and the first magnet 52 may be disposed on the side of the edge 342 of the bottom plate 34 from the center of the paper cassette 221 in the first length direction 1D. For this reason, the paper-length detection device 30 only needs to include at least one of the first regulatory member 42 or the second regulatory member 44. Further, the first moving mechanism 601 only needs to be configured to cause the first magnet 52 to rotate in accordance with the movement of the first regulatory member 42 relative to the bottom plate 34, for example.

Therefore, in accordance with this embodiment, it is possible to provide the paper-length detection device 30 capable of detecting the size of the paper P.

Modification of First Embodiment

Figure 10:
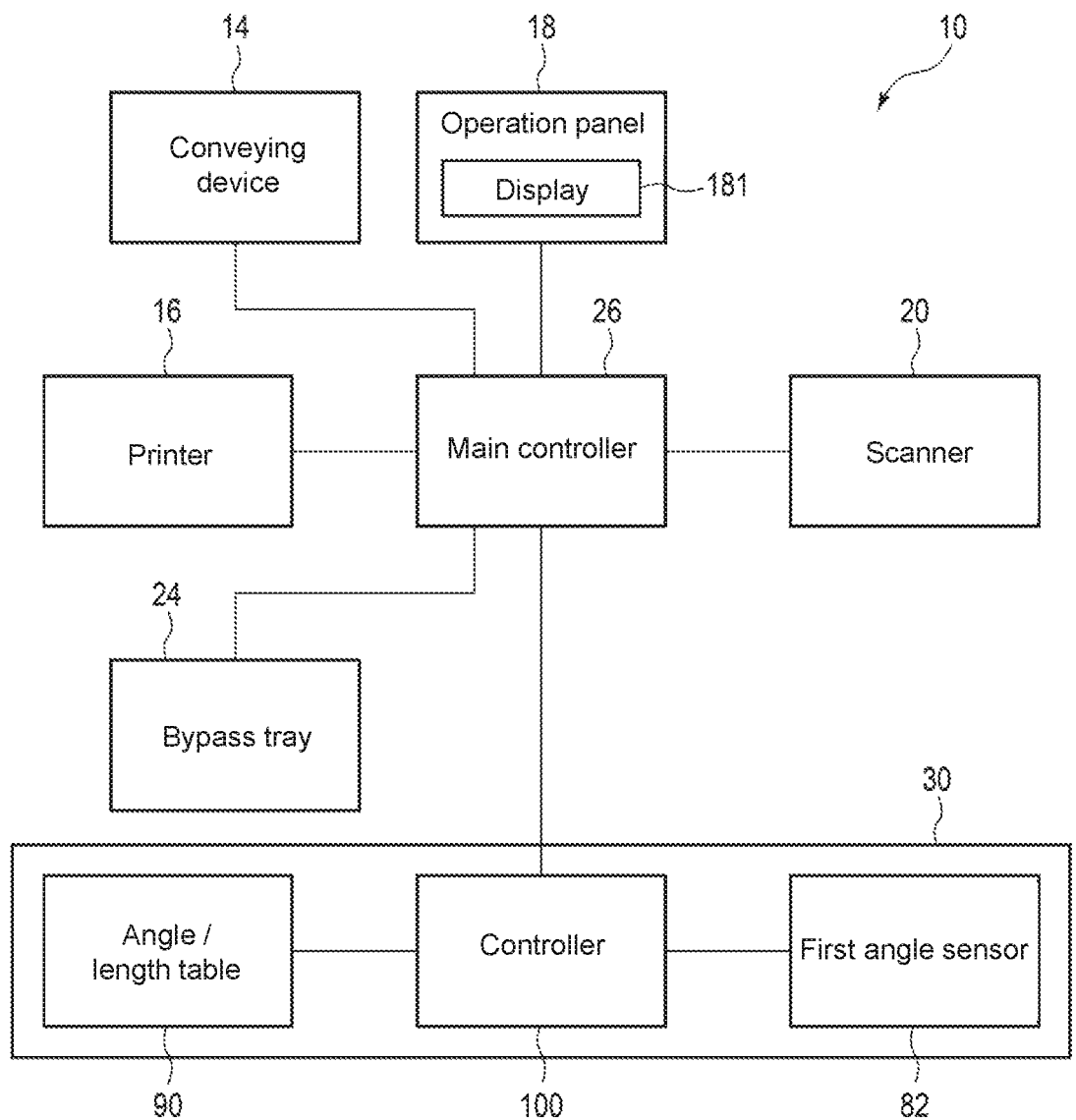
FIG. 10 is a block diagram showing an image forming apparatus according to a modification of the first embodiment.

In the first embodiment, an example in which the main controller 26 calculates the absolute angle of the first magnet 52 with respect to the first angle sensor 82 on the basis of the signal from the first angle sensor 82 and refers to the angle/length table 90 to output information of the paper length corresponding to the absolute angle described above has been described. Meanwhile, the paper-length detection device 30 according to a modification of the first embodiment includes the angle/length table 90 and a controller 100 in addition to the first angle sensor 82 as shown in FIG. 10. The first angle sensor 82 includes the substrate 821 and the angle sensor element 822 fixed to the substrate 821 shown in FIG. 6. The controller 100 calculates the absolute angle of the first magnet 52 on the basis of the signal from the angle sensor element 822, and outputs the paper length stored in the angle/length table 90 corresponding to the absolute angle. The angle/length table 90 and the controller 100 are provided in, for example, the substrate 821. In this case, the first angle sensor 82 is formed as an IC chip including the angle/length table 90 and the controller 100. The controller 100 outputs, on the basis of the output signal from the angle sensor element 822, the absolute angle of the first magnet 52 and the distance between the first regulatory member 42 and the second regulatory member 44 corresponding to the absolute angle of the first magnet 52.

Therefore, the paper-length detection device 30 is capable of outputting the distance between the first regulatory member 42 and the second regulatory member 44 using the main controller 26. The paper-length detection device 30 is capable of displaying, for example, the distance between the first regulatory member 42 and the second regulatory member 44 on the display 181 using the main controller 26 connected to the controller 100.

In accordance with this modification, it is possible to provide the paper-length detection device 30 capable of detecting the size of the paper P.

Second Embodiment

A second embodiment of the image forming apparatus 10 will be described using FIG. 11. In the second embodiment, description of the same content as that described in the first embodiment (including the modification) will be omitted as appropriate.

Figure 11:
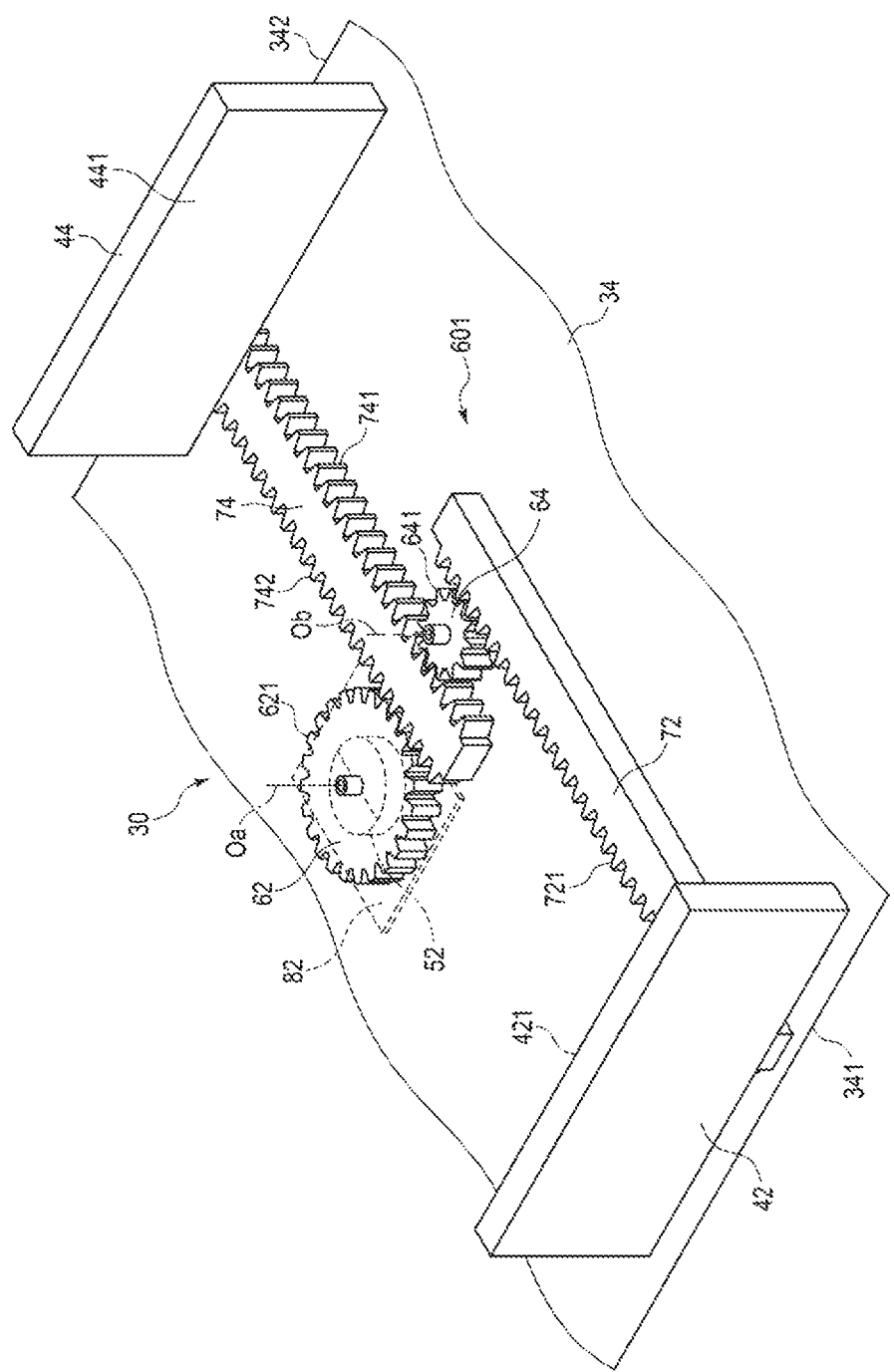
FIG. 11 is a perspective view showing part of a paper-length detection device of a paper cassette of an image forming apparatus according to a second embodiment.

FIG. 11 is a perspective view schematically showing part of the paper-length detection device 30. The positional relationship between the first regulatory member 42, the second regulatory member 44, the first extending member 72, and the second extending member 74 shown in FIG. 11 is the same as that in the first embodiment shown in FIG. 5.

As shown in FIG. 11, the first moving mechanism 601 of the paper-length detection device 30 according to the second embodiment includes the first rotating body 62, a second rotating body 64, the first extending member 72, and the second extending member 74. As shown in FIG. 11, the first rotating body 62, the second rotating body 64, the first extending member 72, and the second extending member 74 of the paper-length detection device 30 are placed on the bottom plate 34. It is suitable that the first rotating body 62, the first extending member 72, and the second extending member 74 are provided in the recessed portion formed in the bottom plate 34, similarly to the recessed portions 63, 73, and 75 described in the first embodiment. It is suitable that also the second rotating body 64 is provided in the recessed portion formed in the bottom plate 34.

In this embodiment, the first rotating body 62 that supports the first magnet 52 is disposed at not a position between the first extending member 72 and the second extending member 74 but a position closer to the positioning unit 321 with respect to the second extending member 74.

The second extending member 74 includes not only the second teeth portions 741 described in the first embodiment but also a plurality of third teeth portions 742 on the side opposite to the second teeth portions 741. The third teeth portions 742 of the second extending member 74 engage with the first engagement teeth 621 of the first rotating body 62 when the second regulatory member 44 is caused to move relative to the bottom plate 34. The second extending member 74 is formed as, for example, as a rack having the third teeth portions 742 as a rack gear. The first rotating body 62 is formed as, for example, a pinion having the first engagement teeth 621 as a pinion gear. Therefore, in this embodiment, the second extending member 74 and the first rotating body 62 are in a rack-and-pinion relationship.

The second rotating body 64 is formed in a disk shape having a diameter smaller than that of the first rotating body 62. The virtual central axis (rotation shaft) Ob of the second rotating body 64 extends in the direction perpendicular to the paper P housed in the paper housing unit 32. The second rotating body 64 includes second engagement teeth 641 on the outer peripheral surface of the second rotating body 64. The second engagement teeth 641 engagement with both the first teeth portions 721 of the first extending member 72 and the second teeth portions 741 of the second extending member 74. The second rotating body 64 is formed as a pinion having the second engagement teeth 641 as a pinion gear.

The second rotating body 64 rotates by more than one rotation (360°) in the movable range of the first regulatory member 42 and the second regulatory member 44. The rotation angles of the first magnet 52 and the first rotating body 62 do not exceed one rotation in the movable range of the first regulatory member 42 and the second regulatory member 44. Therefore, the first angle sensor 82 immediately below the first magnet 52 and the first rotating body 62 outputs the signal relating to an absolute angle of the first magnet 52 to the main controller 26.

The second rotating body 64 has a diameter smaller than that of the first rotating body 62. In the case where the first engagement teeth 621 of the first rotating body 62 and the second engagement teeth 641 of the second rotating body 64 have the same number of teeth, the use of the second rotating body 64 between the first extending member 72 and the second extending member 74 causes the first regulatory member 42 and the second regulatory member 44 to smoothly move as compared with the case of using the first rotating body 62.

Note that since the operation of the image forming apparatus 10 including the paper-length detection device 30 has been described in the first embodiment, description thereof is omitted.

In accordance with this embodiment, it is possible to provide the paper-length detection device 30 capable of detecting a paper length.

Third Embodiment

The image forming apparatus 10 according to a third embodiment will be described with reference to FIG. 12 and FIG. 13. In the third embodiment, description of the same content as that described in the first embodiment (including the modification) and the second embodiment is omitted.

Figure 12:
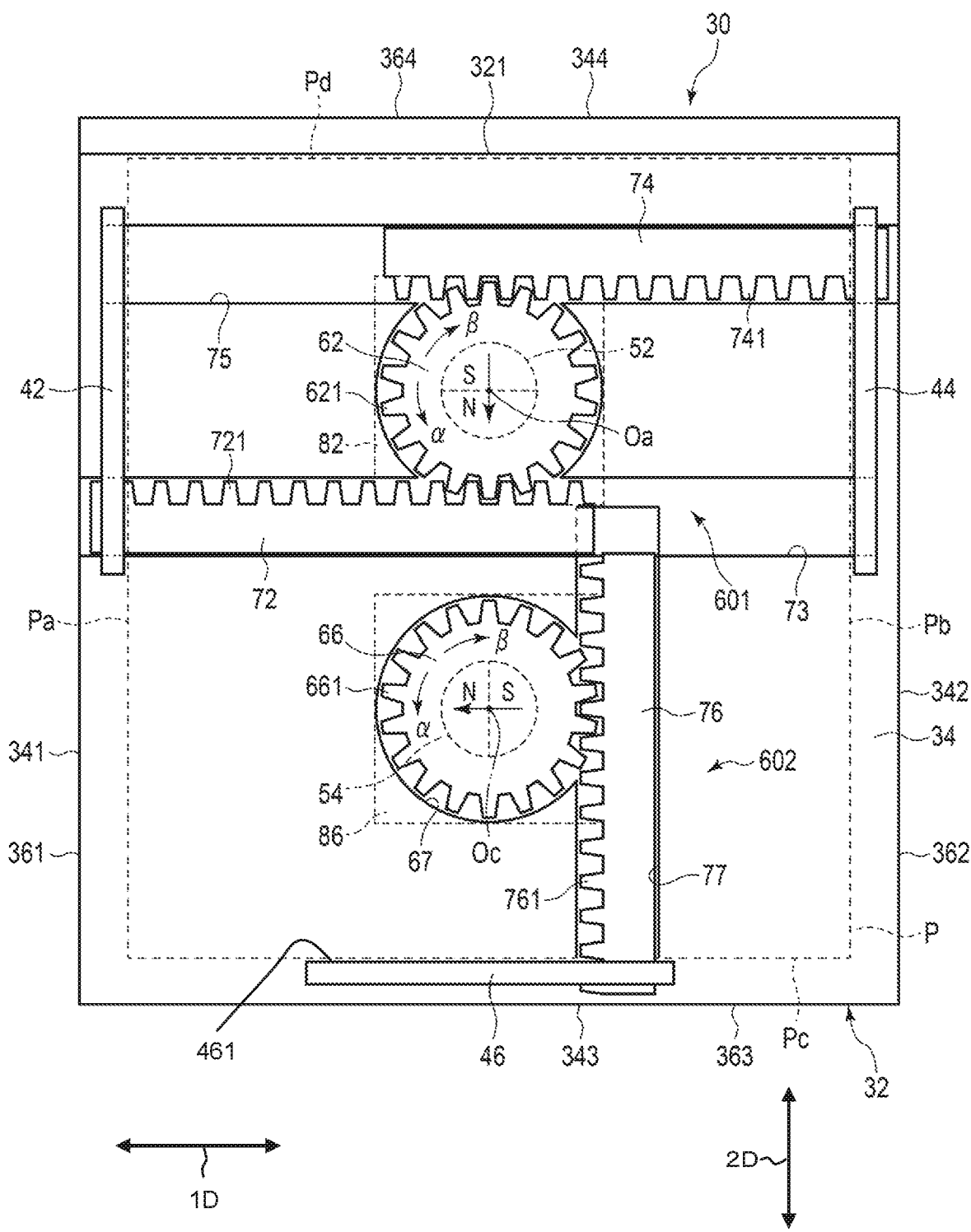
FIG. 12 is a top view showing a paper cassette of an image forming apparatus according to a third embodiment.

As shown in FIG. 12, the paper-length detection device 30 according to the third embodiment includes a third regulating member (paper regulating unit) 46 that regulates the third edge Pc of the paper P. The paper-length detection device 30 includes a second moving mechanism 602 that supports a second magnet 54 and causes the second magnet 54 to rotate in accordance with the movement of the third regulating member 46 relative to the bottom plate 34. The third regulating member is capable of moving in the proximate direction and separation direction in which it respectively moves closer to and further from the positioning unit 321 along the second length direction 2D by the second moving mechanism 602.

The second moving mechanism 602 includes a third rotating body 66 that supports the second magnet 54 and has a disk shape. The third rotating body 66 is housed in a recessed portion 67 that is formed in the bottom plate 34 and has a substantially circular shape. A virtual central axis (rotation shaft) Oc of the third rotating body 66 extends in the direction perpendicular to the paper P housed in the paper housing unit 32. The third rotating body 66 includes a plurality of third engagement teeth 661 on the outer peripheral surface. The third rotating body 66 is formed as a pinion having the third engagement teeth 661 as a pinion gear.

The second moving mechanism 602 includes a third extending member 76. The third extending member 76 is fixed to the third regulating member 46. The third extending member 76 extends from the third regulating member 46 toward the positioning unit 321 along the second length direction 2D.

The third extending member 76 has, for example, an elongated rectangular plate shape. The third extending member 76 is housed in a recessed portion 77 formed in the bottom plate 34. The recessed portion 77 is formed between the side plate 363 and the positioning unit 321. The third extending member 76 and the recessed portion 77 extend in the direction perpendicular to the movement direction of the first regulatory member 42 and the second regulatory member 44. The recessed portion 77 communicates with the recessed portion 67. The third extending member 76 moves within a predetermined range while maintaining the state of being parallel to the side plates 361 and 362. The third extending member 76 includes, for example, fourth teeth portions 761 that engage with the third engagement teeth 661 of the third rotating body 66 at the end thereof on the side of the side plate 361. The third extending member 76 is formed as a rack having the fourth teeth portions 761 as a rack gear.

The third engagement teeth 661 of the third rotating body 66 and the fourth teeth portions 761 of the third extending member 76 are maintained in contact with each other. The second moving mechanism 602 causes the third extending member 76 to move along the recessed portion 77 in accordance with the movement of the third regulating member 46 in the proximate direction in which it comes closer to the positioning unit 321. The third extending member 76 and the third rotating body 66 are in a rack-and-pinion relationship.

Note that the third extending member 76 shown in FIG. 12 is disposed to pass below the first extending member 72, for example.

The second moving mechanism 602 causes the third regulating member 46 to move in the proximate direction in which it comes closer to the positioning unit 321 along the second length direction 2D. The second moving mechanism 602 then causes the third rotating body 66 to rotate in the first direction α relative to the central axis Oc in accordance with the movement of the third regulating member 46 in the proximate direction. For this reason, the second magnet 54 supported by the third rotating body 66 rotates in the first direction a in accordance with the rotation of the third rotating body 66 in the first direction α. The second moving mechanism 602 causes the third regulating member 46 to move in the separation direction in which it is separated from the positioning unit 321 along the second length direction 2D. The second moving mechanism 602 causes the third rotating body 66 to rotate in the second direction β with respect to the central axis Oc in accordance with the movement of the third regulating member 46 in the separation direction. For this reason, the second magnet 54 supported by the third rotating body 66 rotates in the second direction β in accordance with the movement of the third rotating body 66 in the second direction β. Therefore, the third rotating body 66 and the second magnet 54 rotate in accordance with the movement of the third extending member 76 along the recessed portion 77. The central axis Oc of the second magnet 54 and the third rotating body 66 does not move. The central axis Oc of the second magnet 54 and the third rotating body 66 is located at, for example, the center of the paper cassette 221 in the first length direction 1D.

The paper-length detection device 30 includes, at a position facing the second magnet 54, a second angle sensor 86 that outputs a signal corresponding to the absolute angle with the second magnet 54. It is suitable that the second angle sensor 86 is provided in the paper cassette housing device 22 below the bottom plate 34.

Figure 13:
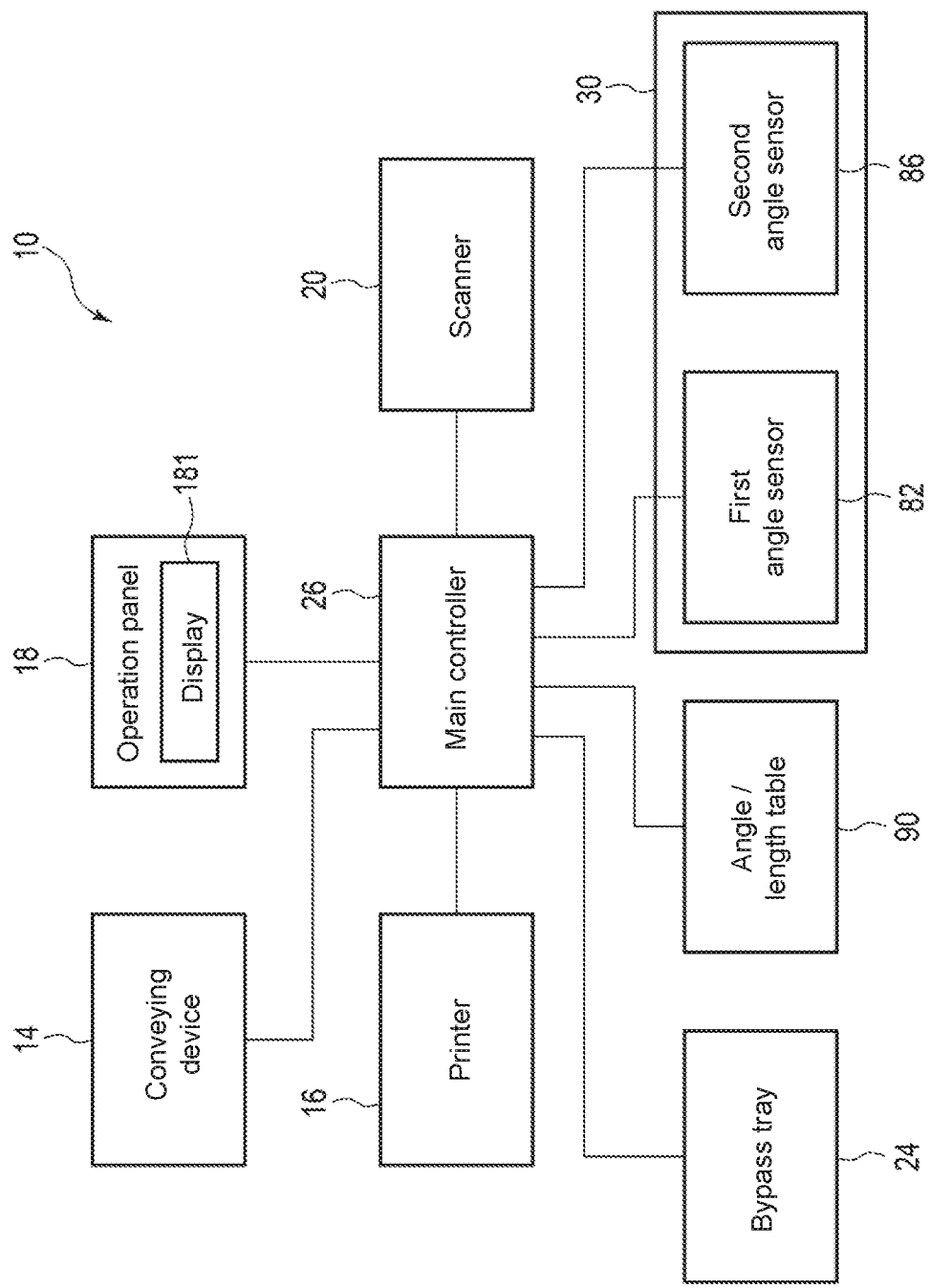
FIG. 13 is a block diagram showing an image forming apparatus according to a modification of the third embodiment.

As shown in FIG. 13, the second angle sensor 86 is connected to, for example, the main controller 26, and is controlled by the main controller 26. The second angle sensor 86 is configured similarly to the first angle sensor 82. That is, regardless of whether or not the second magnet 54 rotates, the second angle sensor 86 outputs respective signals (two-phase signals) of sin θ, cos θ, −sin θ, and −cos θ that are shifted by ¼ cycle.

In this embodiment, assumption is made that when the width between the third regulating member 46 and the positioning unit 321 is the smallest, the direction in which the N pole of the second magnet 54 faces is a direction of 0° with respect to the central axis Oc of the second magnet 54 and the third rotating body 66. Therefore, the main controller 26 outputs, on the basis of the signal output from the second angle sensor 86, the absolute angle of one rotation (0° or more and less than 360°) of the third rotating body 66 supported by the second magnet 54.

Similarly to the graph shown in FIG. 8, the length according to the absolute angle of the second magnet 54 is defined in accordance with the output of the absolute angle of the second magnet 54 by the second angle sensor 86. The information of the length corresponding to the absolute angle is stored in the angle/length table 90. Therefore, the main controller 26 outputs the length of the paper P on the basis of the information stored in the angle/length table 90.

The paper-length detection device 30 according to this embodiment described above includes the bottom plate 34, the third regulating member 46, the positioning unit 321 serving as a regulating member, the second magnet 54, the second moving mechanism 602, and the second angle sensor 86 as shown in FIG. 12. The second moving mechanism 602 supports the second magnet 54 and causes the second magnet 54 to rotate in accordance with the movement of the third regulating member 46 relative to the bottom plate 34. The second angle sensor 86 faces the second magnet 54 and outputs a signal corresponding to the absolute angle with the second magnet 54. Such a paper-length detection device 30 outputs, as a signal relating to an angle, the paper length between a regulating surface 461 of the third regulating member 46 and the positioning unit 321 in the second length direction 2D. The image forming apparatus 10 including the paper-length detection device 30 outputs the distance between the third regulating member 46 and the positioning unit 321.

The paper-length detection device 30 according to this embodiment is capable of detecting both the length of the paper P along the first length direction 1D and the length of the paper P along the second length direction 2D. Therefore, in accordance with this embodiment, it is possible to provide the paper-length detection device 30 capable of detecting the paper length.

Note that the central axis Oc of the second magnet 54 and the third rotating body 66 may be located at, for example, not the center of the paper cassette 221 in the first length direction 1D but a position on the side of the edge 341 or the edge 342 of the bottom plate 34.

Fourth Embodiment

The image forming apparatus 10 according to a fourth embodiment will be described with reference to FIG. 14. In the fourth embodiment, description of the same content as that described in the first embodiment (including the modification) to the third embodiment is omitted.

Figure 14:
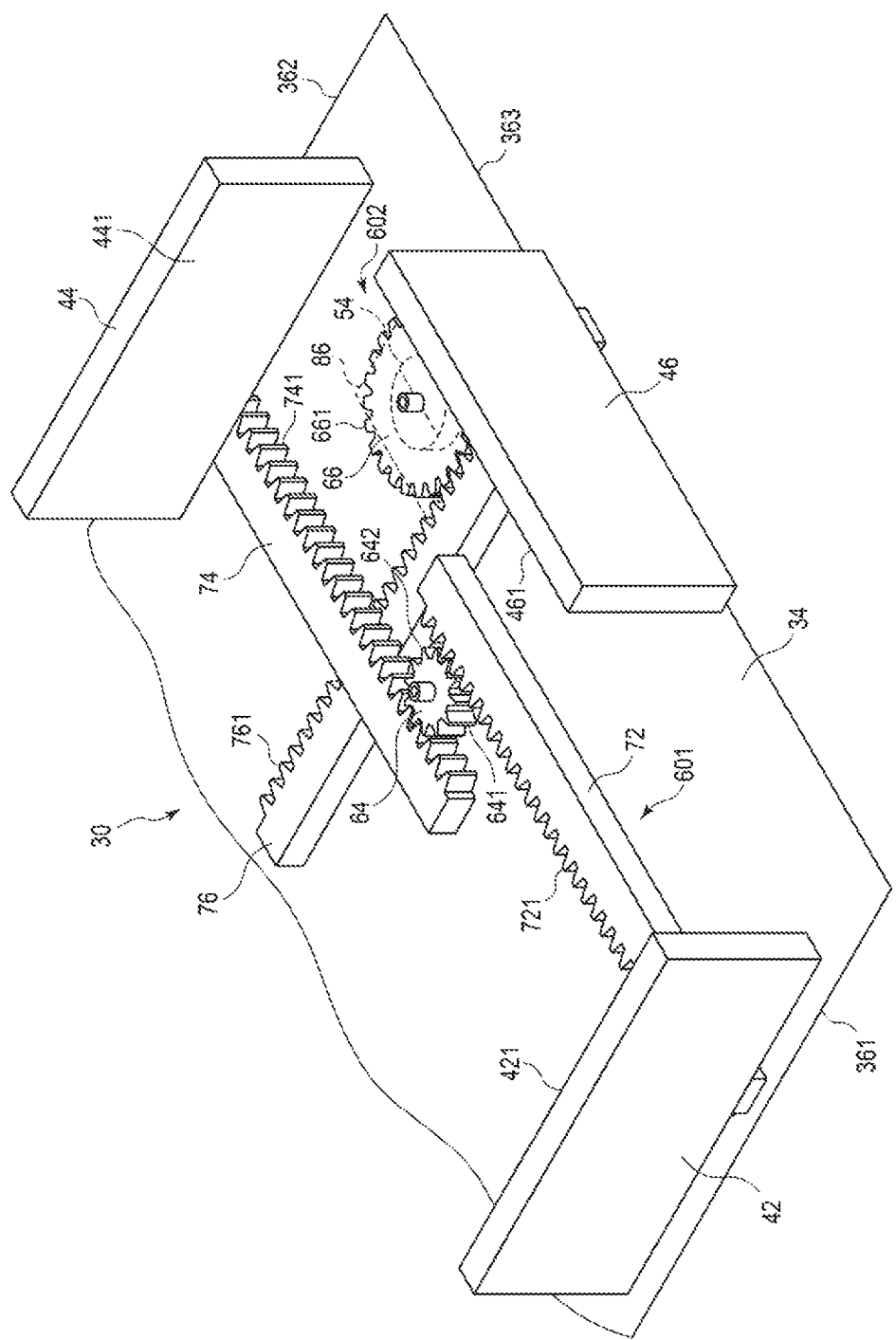
FIG. 14 is a perspective view showing part of a paper-length detection device of a paper cassette of an image forming apparatus according to a fourth embodiment.

The paper-length detection device 30 shown in FIG. 14 includes the first regulatory member 42, the second regulatory member 44, and the second rotating body 64, the first extending member 72, and the second extending member 74 of the first moving mechanism 601, similarly to the second embodiment shown in FIG. 11. Further, the paper-length detection device 30 shown in FIG. 14 includes the third regulating member 46, and the third rotating body 66 and the third extending member 76 of the second moving mechanism 602, similarly to the third embodiment shown in FIG. 12.

The paper-length detection device 30 shown in FIG. 14 regulates the end surface of the paper P by the first regulatory member 42 and the second regulatory member 44, causes the third regulating member 46 to move closer to or further from the positioning unit 321, and measures the paper length. The example shown in FIG. 14 is an example in which the first magnet 52, the first rotating body 62, and the first angle sensor 82 are not used.

The paper-length detection device 30 according to this embodiment is capable of detecting a paper length as described above. Therefore, in accordance with this embodiment, it is possible to provide the paper-length detection device 30 capable of detecting a paper length.

In accordance with at least one of the embodiments described above, it is possible to provide the paper-length detection device 30 capable of detecting a paper length.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:
1. A paper-length detection device, comprising:
a bottom plate, a paper sheet being placed on the bottom plate, the paper sheet having a first edge and a second edge opposed to the first edge;

a first regulatory member that is provided to be capable of moving relative to the bottom plate in a direction in which the first edge and the second edge face each other, and is in contact with the first edge;
a second regulatory member that is in contact with the second edge;
a magnet that rotates while a direction from an S pole and an N pole thereof is parallel to the bottom plate;
a moving mechanism that
supports the magnet, and
causes the magnet to rotate in accordance with movement of the first regulatory member closer to or further from the second regulatory member;
an angle sensor that faces the magnet and outputs a signal of a voltage value corresponding to a magnetic field that periodically varies in accordance with the rotation of the magnet, the voltage value corresponding to an absolute angle of the magnet, an absolute value of a length of the paper sheet being output based on the absolute angle.

2. The paper-length detection device according to claim 1, further comprising:
a controller that outputs information of an absolute angle of the magnet on a basis of the voltage value of the signal output by the angle sensor; and
a storage table that stores distances between the first regulatory member and the second regulatory member that continuously increase from a minimum value to a maximum value corresponding to absolute angles from 0° or more to less than 360° or distances between the first regulatory member and the second regulatory member that continuously increase from a minimum value to a maximum value corresponding to absolute angles from 0° or more to less than 180°,
the controller referring to the storage table and outputting information of the distance corresponding to the absolute angle, which includes the absolute value of the length of the paper sheet.

3. The paper-length detection device according to claim 1, wherein
the moving mechanism includes
a first rotating body that supports the magnet and has a disk shape, and
a first extending member that
is fixed to the first regulatory member,
extends from the first regulatory member to an outer peripheral surface of the first rotating body, and
causes, where the first regulatory member moves relative to the bottom plate, the first rotating body to rotate at a rotation angle corresponding to a moving distance of the first regulatory member.

4. The paper-length detection device according to claim 3, wherein
the first rotating body includes a first gear formed on the outer peripheral surface, and
the first extending member includes a second gear that engages with the first gear.

5. The paper-length detection device according to claim 3, wherein
the second regulatory member is provided to be capable of moving relative to the bottom plate in the direction in which the first edge and the second edge face each other, and
the moving mechanism includes
a second rotating body that has a disk shape having a diameter smaller than that of the first rotating body and has an outer peripheral surface that is in contact with an end of the first extending member opposite to the first rotating body, and
a second extending member that
is fixed to the second regulatory member,
extends between the second regulatory member and the outer peripheral surface of the second rotating body, and
causes, where the second regulating member moves relative to the bottom plate, the second rotating body to rotate and the first rotating body to rotate at a rotation angle corresponding to a moving distance of the second regulatory member.

6. An image forming apparatus, comprising:
a paper housing device that houses a sheet of paper;
a printer that forms an image on the paper;
a conveying device that conveys the paper housed in the paper housing device to the printer;
a paper-length detection device that detects a length of the paper housed in the paper housing device; and
a first controller that adjusts magnification of image data in accordance with a length of the paper detected by the paper-length detection device and causes the printer to form an image on a basis of the magnification-adjusted image data, wherein
the paper-length detection device includes
a bottom plate, a paper sheet being placed on the bottom plate, the paper sheet having a first edge and a second edge opposed to the first edge,
a first regulatory member that is provided to be capable of moving relative to the bottom plate in a direction in which the first edge and the second edge face each other, and is in contact with the first edge,
a second regulatory member that is in contact with the second edge,
a magnet that rotates while a direction from an S pole and an N pole are parallel to the bottom plate,
a moving mechanism that
supports the magnet, and
causes the magnet to rotate in accordance with movement of the first regulatory member closer to or further from the second regulatory member, and
an angle sensor that faces the magnet, and outputs a signal of a voltage value corresponding to a magnetic field that periodically varies in accordance with the rotation of the magnet, the voltage value corresponding to an absolute angle of the magnet, an absolute value of a length of the paper sheet being output based on the absolute angle.

7. The image forming apparatus according to claim 6, wherein
the paper-length detection device further includes
a second controller that outputs information of an absolute angle of the magnet on a basis of the voltage value of the signal output by the angle sensor, and
a storage table that stores distances between the first regulatory member and the second regulatory member that continuously increase from a minimum value to a maximum value corresponding to absolute angles from 0° or more to less than 360° or distances between the first regulatory member and the second regulatory member that continuously increase from a minimum value to a maximum value corresponding to absolute angles from 0° or more to less than 180°,
the second controller refers to the storage table and outputs, as information of a length of the paper, information of the distance corresponding to the absolute angle to the first controller, which includes the absolute value of the length of the paper sheet.

8. The image forming apparatus according to claim 6, wherein
the moving mechanism of the paper-length detection device includes
a first rotating body that supports the magnet and has a disk shape, and
a first extending member that
is fixed to the first regulatory member,
extends from the first regulatory member to an outer peripheral surface of the first rotating body, and
causes, where the first regulatory member moves relative to the bottom plate, the first rotating body to rotate at a rotation angle corresponding to a moving distance of the first regulatory member.

9. The image forming apparatus according to claim 8, wherein
the first rotating body includes a first gear formed on the outer peripheral surface, and
the first extending member includes a second gear that engages with the first gear.

10. The image forming apparatus according to claim 8, wherein
the second regulatory member is provided to be capable of moving relative to the bottom plate in the direction in which the first edge and the second edge face each other; and
the moving mechanism includes
a second rotating body that has a disk shape having a diameter smaller than that of the first rotating body and has an outer peripheral surface that is in contact with an end of the first extending member opposite to the first rotating body, and
a second extending member that
is fixed to the second regulatory member,
extends between the second regulatory member and the outer peripheral surface of the second rotating body, and
causes, where the second regulating member moves relative to the bottom plate, the second rotating body to rotate and the first rotating body to rotate at a rotation angle corresponding to a moving distance of the second regulatory member.

11. The paper-length detection device according to claim 1, wherein
the angle sensor includes four magnetic detection elements of which diagonal directions cross at a rotational axis of the magnet,
each of the four magnetic detection elements includes a magnetic resistance element, and
a magnetization direction of each of the magnetic resistance elements is perpendicular to magnetization directions of neighboring two of the magnetic resistance elements.

12. The paper-length detection device according to claim 11, wherein a magnetization direction of each of the magnetic resistance elements is opposite to a magnetization direction of another one of the magnetic resistance elements at a diagonal position thereof.

* * * * *